United States Patent Office 3,164,588
Patented Jan. 5, 1965

3,164,588
METHOD FOR THE PREPARATION OF 1,2,4-BENZOTHIADIAZINE-1,1-DIOXIDE COMPOUNDS
John Sidney Irons, London, and Trevor Morgan Cook, East Barnet, England, assignors to Merck & Co., Inc., Rahway, N.J., a corporation of New Jersey
No Drawing. Filed June 10, 1960, Ser. No. 35,143
Claims priority, application Great Britain June 19, 1959
7 Claims. (Cl. 260—243)

This invention relates to 1,2,4-benzothiadiazine-1,1-dioxide compounds and is more particularly concerned with methods of preparing derivatives of such compounds in which the heterocyclic ring is saturated.

1,2,4-benzothiadiazine-1,1-dioxide compounds having the general formula:

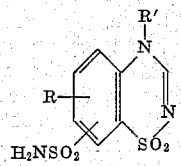

in which R is a hydrogen or halogen atom or an organic substituent such as a lower alkyl or lower alkoxy radical and R' represents a hydrogen atom or an organic substituent, can be prepared by cyclization of a disulfamylaniline compound having the general formula:

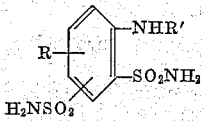

e.g., by using formic acid or ethyl orthoformate. In this process the disulfamylaniline compound is conveniently prepared from a substituted aniline

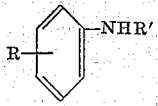

by introducing a pair of chlorosulfonic acid groups into the starting material, one such group being ortho to the amino group, and then treating the resulting aniline-disulfonyl chloride to convert the chlorosulfonic acid groups to sulfamyl groups. The preparation of certain 1,2,4-benzothiadiazine-1,1-dioxide compounds by the above route is described in U.S. Patent No. 2,809,194 and corresponding U.K. Patents Nos. 826,921, 826,922, 826,923 and 826,924.

When attempts are made to prepare derivatives of 1,2,4-benzothiadiazine-1,1-dioxide compounds in which the heterocyclic ring is saturated, by carrying out the cyclization step referred to above by means of a cyclization agent of the type that results in a saturated heterocyclic ring, e.g., agents having carbonyl groups, such as ketones, aldehydes, ketals and acetals, the yields of the desired derivatives are substantially less than those in the parallel process for the preparation of their unsaturated analogues; moreover, an additional number of processing steps have, in many instances, been found to be necessary, in particular, the isolation and purification of the disulfamylaniline compound subjected to cyclization.

It has now been unexpectedly discovered that derivatives of 1,2,4-benzothiadiazine-1,1-dioxide in which the heterocyclic ring is saturated can be made by subjecting a 1,2,4-benzothiadiazine-1,1-dioxide compound having an unsaturated heterocyclic ring to a reaction with a carbonyl compound, viz. an aldehyde or ketone or a compound capable of yielding an aldehyde or ketone under the reaction conditions.

The mechanism by which this reaction proceeds is not understood. The mechanism does not involve direct reduction because the carbonyl carbon atom from the carbonyl reactant, as shown by experiments using radioactive tracer techniques, actually enters into the thiadiazine ring. The fact that direct reduction does not take place was to be expected, but the entry of the carbonyl carbon atom into the thiadiazine ring is difficult to explain in view of the fact that treatment of the unsaturated starting compound in the absence of the carbonyl reactant under conditions otherwise comparable with those used in the reaction of the invention does not lead to opening of the thiadiazine ring to form a disulfamylaniline derivative. If the ring had been opened in these circumstances the entry of the carbonyl carbon atom would be explained, but the fact that the reaction of the invention proceeds under conditions that do not cause ring opening of the starting compound is wholly surprising and an explanation of the mechanism involved has yet to be established.

Preferably the reaction is carried out under alkaline conditions e.g. using a mildly alkaline solution of an alkalimetal salt of the starting compound. Care should be taken to avoid such strongly alkaline conditions as will cause permanent opening of the ring. The preferred reactants are aldehydes or compounds capable of yielding aldhydes such as acetals and aldols.

In accordance with a preferred procedure, the 1,2,4-benzothiadiazine-1,1-dioxide compounds are converted to 3,4-dihydro-1,24-benzothiadiazine-1,1-dioxide compounds by reaction with formaldehyde or a formaldehyde-yielding compound such as paraformaldehyde or dimethylformamide. This reaction is preferably carried out in a polar solvent such as water, methanol, ethanol, or t-butanol and under mildly alkaline conditions. Mildly alkaline conditions, e.g. 1 gram-molecule of alkali to 1 gram-moecule of benzothiadiazine-1,1-dioxide compound, facilitate solution of the starting material, but the pH must not be so high that the heterocyclic ring will open permanently. The quantity of formaldehyde is preferably in the range from 1 to 2 gram molecules per gram molecule of the benzothiadiazine-1,1-dioxide starting material, excessive quantities of formaldehyde resulting in decreased yields and the production of useless materials.

The reaction may suitably be carried out at the reflux temperature of the solvent, and a period of the order of 2 hours is generally sufficient to carry it to completion.

A suitable method of preparing the 1,2,4 benzothiadiazine compounds having an unsaturated heterocyclic ring involves the cyclization of an appropriate 2,4-disulfamylaniline compound, e.g., by methods set forth in U.S. Patent 2,809,194. It has been found that the yields of unsaturated 1,2,4-benzothiadiazine compounds obtained by a two-step process involving such a cyclization followed by conversion to the saturated compound in accordance with the invention are in many cases greater and the number of processing steps fewer than in the direct cyclization of 2,4-disulfamylaniline compounds with a ketone or aldehyde.

A typical process for preparing 1,2,4-benzothiadiazine compounds having a saturated heterocyclic ring from aniline compounds may be represented as follows:

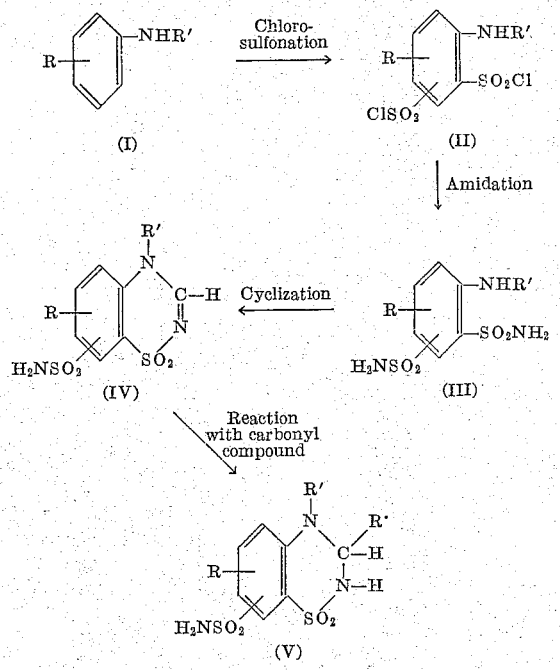

In the above reaction scheme, R is a radical or atom, usually one that is not affected by the conditions of reaction, such as a hydrogen atom; a halogen atom or halogen-like group e.g., chlorine, fluorine, or a trihalomethyl group such as trifluoromethyl; a hydrocarbon group, e.g., alkyl, preferably lower alkyl; and ether group, e.g., alkoxy, preferably lower alkoxy; a nitro group; and each alkyl, preferably lower alkyl; an ether group, e.g., alkyl) radical, or a hydrocarbon radical having inert substituents such as halogen atoms, ether groups, and nitro groups. If R' is hydrogen, Compound IV exists in two tautomeric forms in one of which this hydrogen is on the 4-nitrogen with a 2(3) double bond and in the other of which it is on the 2-nitrogen with a 3(4) double bond.

The reactions in this scheme are preferably carried out as follows: An aniline derivative (Compound I) is chlorosulfonated e.g., in the presence of an alkali metal halide, to produce an aniline-disulfonyl chloride derivative (Compound II) in which one sulfonyl chloride group is ortho to the amino group. This compound is treated with ammonia to give a disulfamyl derivative (Compound III). The cyclization of the disulfamyl derivative is then carried out, for example, by treatment with formic acid or ethyl orthoformate, as is described more fully in U.S. Patent No. 2,809,194, to produce a 1,2,4-benzothiadiazine-1,1-dioxide derivative (Compound IV).

The resulting Compound IV can be precipitated from the reaction mixture by addition of acid or dilution with water, and the precipitate redissolved in alkali for the final step. Alternatively, Compound IV can be purified thoroughly before the final step, but this is by no means necessary.

The final step comprises treating Compound IV with a carbonyl compound, preferably formaldehyde, under mildly alkaline conditions to produce the final 1,2,4-benzothiadiazine-1,1-dioxide derivative having a saturated heterocyclic ring (Compound V).

If Compound III were to be converted directed to Compound V, for example, by reacting with a cyclization agent such as one having the formula:

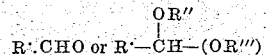

wherein R· is as defined above and R'' and R''' are organic groups it would be necessary to isolate and purify Compound III from the amidation reaction mixture before cyclization. In contrast, when Compound III is converted to Compound V via Compound IV, in accordance with the the present invention, the reaction mixture from the amidation step can itself be treated with the cyclization agent, no isolation or purification step being required.

The 1,2,4-benzothiadiazine-1,1-dioxide compounds having a saturated heterocyclic ring are of interest because they possess diuretic (e.g. natriuretic) properties.

The following examples are illustrative of the invention.

Example 1

To 500 cc. ethanol in a three-necked one-liter flask fitted with stirrer and reflux condenser, was added 67 gms. of chlorothiazide (6-chloro-7-sulfamyl-1,2,4-benzothiadiazine-1,1-dioxide) prepared as in Example 1 of U.S. Patent No. 2,809,194. The stirred suspension was heated to 50° C. and approximately 20 cc. of a solution of 46% sodium hydroxide was added to a pH 8.5 when complete solution was obtained. 18 cc. of a 38% solution of formaldehyde was added and the solution heated under reflux for two hours. The solution was cooled to 20° C. and acidified with hydrochloric acid to a pH of 6-7.

Ethanol was recovered at atmospheric pressure to leave a residual volume of 100 cc. An equal volume of ethanol was added and the solution again concentrated to 100 cc. The volume of the residual solution was then adjusted to 750 cc. with distilled water, and 15 cc of 35% ammonia was added. The solution was then heated to 97° C., when a clear solution was obtained. This was immediately cooled with stirring to 25° C. when a white crystalline product separated out.

The crystalline product was filtered, washed with distilled water until the filtrate was neutral, and dried in an air oven at 70° C. for 12 hours. The product was identified as dihydrochlorothiazide, (6-chloro-7-sulfamyl-3,4-dihydro-1,2,4-benzothiadiazine-1,1-dioxide).

Yield: 42.0 g. (62.3% theoretical based on chlorothiazide).
Appearance: White crystalline solid
Melting Point: 267–269° C.

Example 2

To 500 cc. of distilled water in one-liter three-necked flask fitted with stirrer and reflux condenser, was added 67 gms. chlorothiazide. The stirred suspension was heated to 50° C. and approximately 18 cc. of a 46% solution of sodium hydroxide was added to a pH 8.5-9 when a pale yellow solution of the sodium salt of chlorothiazide was obtained.

18 cc. of a 38% solution of formaldehyde was then added to the flask and the solution heated under reflux (97–101° C.) for 2 hours, following which it was cooled to 20° C. and acidified to pH 6-7 with hydrochloric acid. The volume of the solution was made up to 750 cc. with distilled water, 15 cc. of a solution of 35% ammonia was added and the temperature raised to 97–100° C. When complete solution was obtained, the solution was rapidly cooled to 28° C. with stirring and a white crystalline product separated out.

The crystalline product was filtered off, washed with dilute ammonia and then with distilled water, and finally dried for 12 hours at 70° C. in air. The product was identified as dihydrochlorothiazide.

Yield: 53.5 g. (79% theoretical based on chlorothiazide).
1.0% diazotisables
Melting Point: 263.5–265.5° C.

Example 3

148 g. (1 mol) chlorothiazide was suspended in one liter of distilled water in a two-liter flask fitted with reflux condenser and stirrer. The suspension was heated to 50° C. and 34 cc. of a 46% solution of sodium hydroxide was added to a pH 8.5–9, when complete solution was obtained. 15.8 g. paraformaldehyde (1.05 mols) was then added and the solution heated under reflux for 3 hours. After 30 minutes a precipitate appeared. Finally, the mixture was cooled to room temperature and filtered, and the precipitate washed with distilled water until the filtrate was neutral, and then dried at 70° C. for 12 hours. The precipitate was identified as dihydrochlorothiazide. Yield: 115 g. (77.2% theoretical based on chlorothiazide). Melting Point: 262–263.5° C.

What is claimed is:

1. A method for saturating the heterocyclic ring of a benzothiadiazine having the nuclear formula

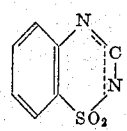

wherein unsaturation occurs at one of the positions 2(3) and 3(4) by heating said compound at about reflux with a carbonyl compound selected from the group consisting of an aldehyde of the formula R·CHO, acetal and aldol in the presence of a polar solvent and under mildly alkaline conditions not exceeding about pH 9 to give the corresponding dihydrobenzothiadiazine having the nuclear formula

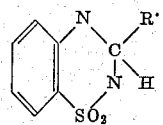

wherein in each of the foregoing compounds R· is selected from the group consisting of hydrogen, lower alkyl, halo-lower alkyl, lower alkoxy-lower alkyl, and nitro-lower alkyl.

2. A process as claimed in claim 1 wherein about 1 mole of the benzothiadiazine is reacted with from 1 to 2 moles of the carbonyl compound.

3. A process as claimed in claim 1 wherein the carbonyl compound is formaldehyde.

4. A process as claimed in claim 1 wherein the carbonyl compound is paraformaldehyde.

5. A process as claimed in claim 1 wherein the carbonyl compound is dimethylformamide.

6. A process as claimed in claim 1 wherein chlorothiazide is heated with formaldehyde in the presence of water to give dihydrochlorothiazide.

7. A process as claimed in claim 1 wherein chlorothiazide is heated with formaldehyde in the presence of ethanol to give dihydrochlorothiazide.

References Cited in the file of this patent

Freeman et al.: J. Org. Chem., vol. 16, pp. 815–837 (1951).

Holdrege et al.: Jour. Amer. Chem. Soc., vol. 81, pp. 4807–4810 (1959).

UNITED STATES PATENT OFFICE
CERTIFICATE OF CORRECTION

Patent No. 3,164,588                          January 5, 1965

John Sidney Irons et al.

It is hereby certified that error appears in the above numbered patent requiring correction and that the said Letters Patent should read as corrected below.

Column 3, lines 38 to 40, strike out "alkyl, preferably lower alkyl; and ether group, e.g., alkoxy, preferably lower alkoxy; a nitro group; and each alkyl, preferably lower alkyl; an ether group, e.g.," and insert instead -- alkyl, preferably lower alkyl; an ether group, e.g., alkoxy, preferably lower alkoxy; a nitro group; and each of R° and R′ is a hydrogen atom, a hydrocarbon (e.g., --.

Signed and sealed this 1st day of June 1965.

(SEAL)
Attest:

ERNEST W. SWIDER                               EDWARD J. BRENNER
Attesting Officer                                    Commissioner of Patents